Aug. 5, 1969 W. J. DE GAIN 3,459,079

INDEXING MACHINE

Filed Sept. 31, 1966 6 Sheets-Sheet 1

INVENTOR
William J. DeGain
BY *Hauke, Kess, & Gifford*
ATTORNEYS

Aug. 5, 1969 W. J. DE GAIN 3,459,079
INDEXING MACHINE
Filed Sept. 31, 1966 6 Sheets-Sheet 2

INVENTOR
William J. DeGain

BY Hauke, Kraus, & Gifford
ATTORNEYS

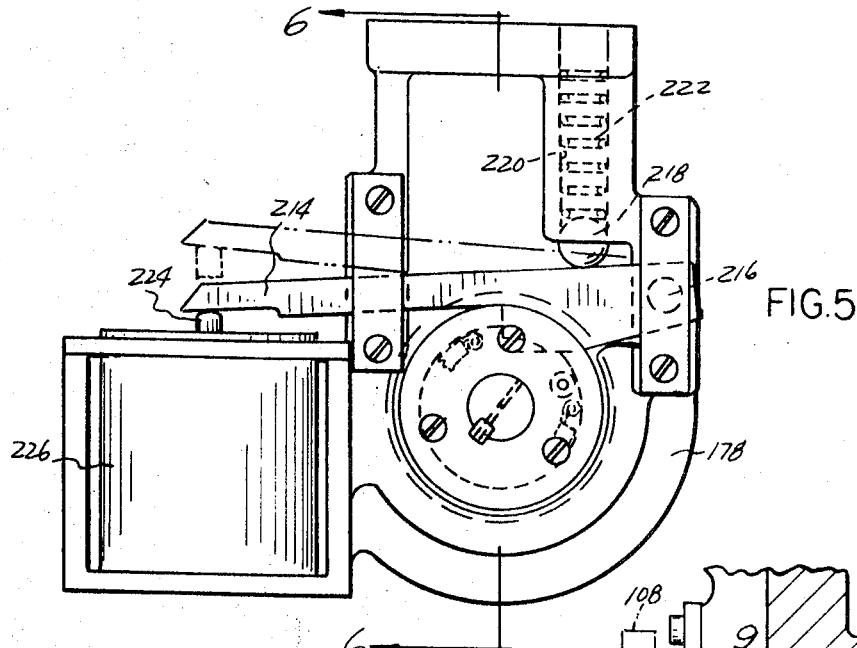
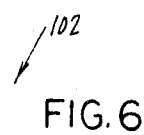
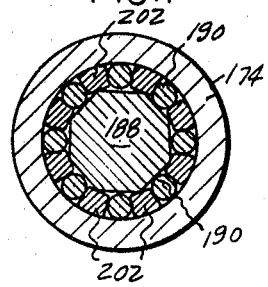
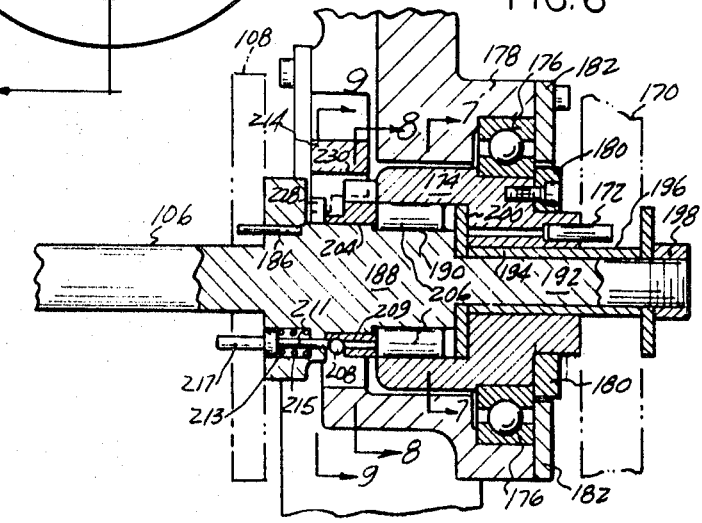

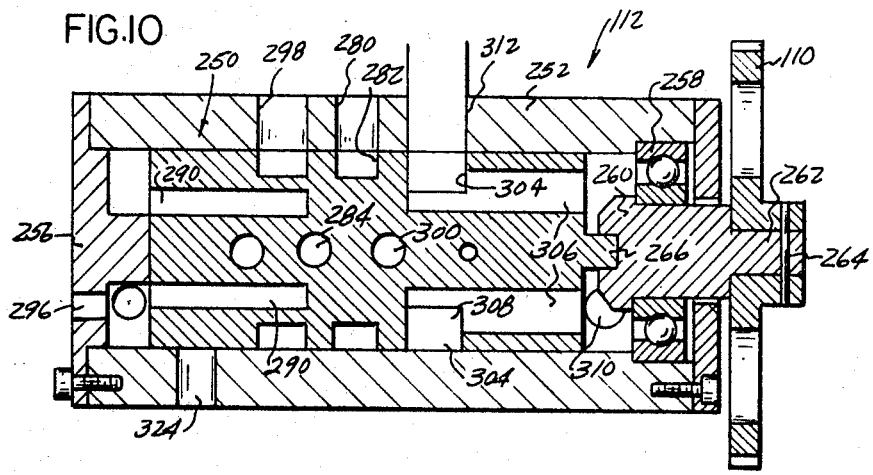
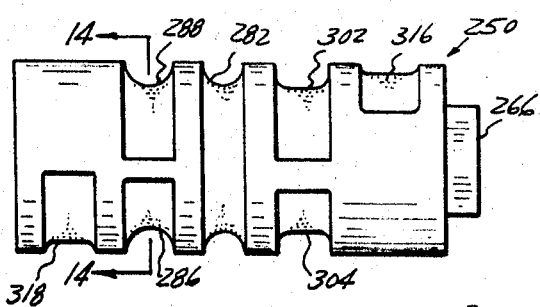
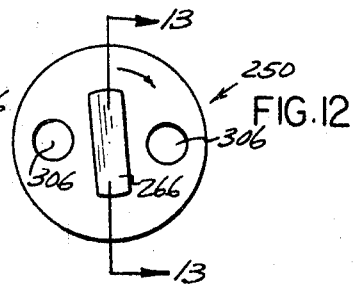
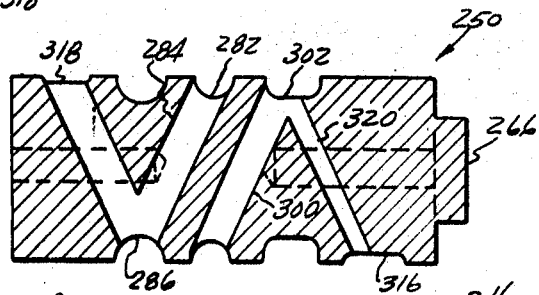
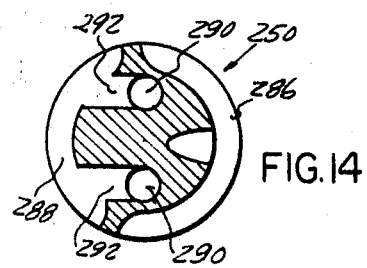
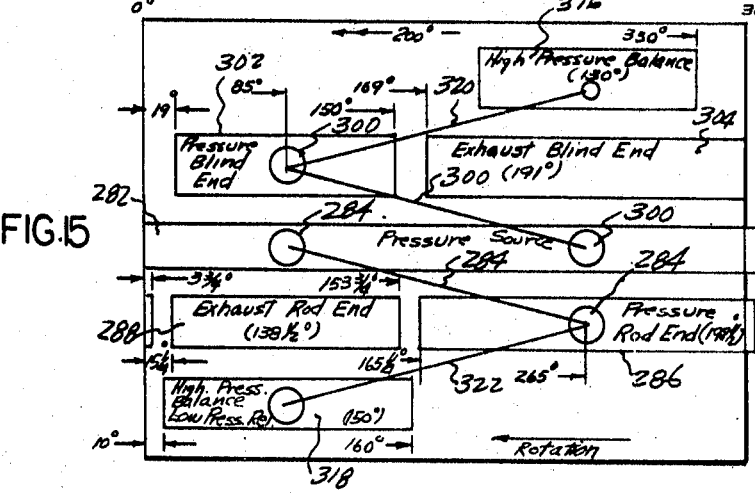

United States Patent Office 3,459,079
Patented Aug. 5, 1969

3,459,079
INDEXING MACHINE
William J. De Gain, Detroit, Mich., assignor, by mesne assignments, to Koppy Tool Corporation, Ferndale, Mich., a corporation of Michigan
Filed Sept. 31, 1966, Ser. No. 581,133
Int. Cl. B26d 5/20, 5/38
U.S. Cl. 83—69
25 Claims

ABSTRACT OF THE DISCLOSURE

A machine tool comprising multiple work stations provided with a rotatable workpiece support having an indexing drive mechanism for the rotatable workpiece support and tools mounted around said rotatable workpiece support adapted to be brought into contact with the workpieces in timed sequence the provision of a common rotational input drive having a clutch-brake to alternately connect and disconnect the input from the tooling and from the indexing drive mechanism at timed rotational intervals.

---

This invention relates to a machine for performing a plurality of operations on a work piece, sequentially, at spaced intervals on the work piece and more particularly such a machine wherein a plurality of identical operations are performed at regular angular intervals about a rotationally symmetrical work piece.

While in its broadest form the present invention provides means for rapidly indexing a work piece, with respect to cutting or forming tools, between a plurality of spaced locations which might be along any predetermined path, and for controlling the operation of the tools on the work piece between indexing motions so as to achieve extremely rapid formation of the number of configurations on the work piece, a preferred embodiment of the invention takes the form of a rotary indexing support, which quickly moves the part between equally spaced peripheral points, so that the tools may operate on the part during the extremely short dwell period of the indexing fixture. Rotary indexing fixtures are generally well known but the present configuration is such as to achieve operating rates far in excess of previous practice. These high operating rates derive from a unique hydro-mechanical drive system for the table and the tooling. In its broadest aspect this system takes the form of a powering motor which drives a cam type rotary index mechanism to provide rotational indexes between predetermined dwells, and also drives a rotary hydraulic valve directing hydraulic fluid to the cylinders that power the motion of the tools in timed relation to the indexing motion. The driving motor connects to the index mechanism and the rotary valve through a unique clutch and brake adapted to stop at an exact rotational position.

The rotary valve incorporates a pair of valving circuits which operate in timed relationship with one another and with the indexing mechanism to provide fluid to the cylinders, vent the cylinders to the sump, and modify the fluid pressure at various points in the cycle. The valve incorporates a number of unique features which allow it to attain exceptionally high rotational speed.

The operating tools are supported on a head retained by four vertical columns. When the columns are lowered the head is in operating position and remains in that position throughout the formation of an entire work piece. After the work piece is completed the columns lift the head into a raised position so that the work support may load and unload. The machine incorporates a safety gate which moves with the head to close off manual access to the working area when the head is in its lowered position. As the head lifts it raises the gate, knocks the work piece off the support on to an output chute and positions a stop which prevents the head from accidentally lowering in the event of hydraulic power failure.

Novel aspects of the present invention include the particular construction of the clutch and brake, the indexing mechanism, the rotary valve, and the work and tool support structure as well as the particular manner in which they are combined to provide high speed, fail-safe forming of a number of identical sections at spaced intervals in the work piece.

Other objects, advantages and applications of the invention will be made apparent by the following detailed description of a preferred embodiment of the invention. The description makes reference to the accompanying drawing in which:

FIGURE 5 is an end view of the clutch brake apparatus which drives the indexing mechanism and the rotary valve;

FIGURE 6 is a sectional view through the clutch brake apparatus taken along lines 6—6 of FIGURE 5;

FIGURE 7 is a sectional view through FIGURE 6, taken along lines 7—7 of that FIGURE;

FIGURE 8 is a sectional view of the locking arm used with the clutch brake, taken along lines 8—8 of FIGURE 6;

FIGURE 9 is another sectional view of the locking end of the clutch brake taken along lines 9—9 of FIGURE 6;

FIGURE 10 is a sectional view through the rotary valve employed with the present invention;

FIGURE 11 is a side view of the spool of the rotary valve;

FIGURE 12 is an end view of the rotary valve;

FIGURE 13 is a sectional view through the spool of the valve taken along lines 13—13 of FIGURE 12;

FIGURE 14 is a sectional view through the rotary valve spoke taken along lines 14—14 of FIGURE 11;

FIGURE 15 is a schematic diagram representing a layout of the spool of the rotary valve, showing the various fluid passages thereof;

Figure 1:
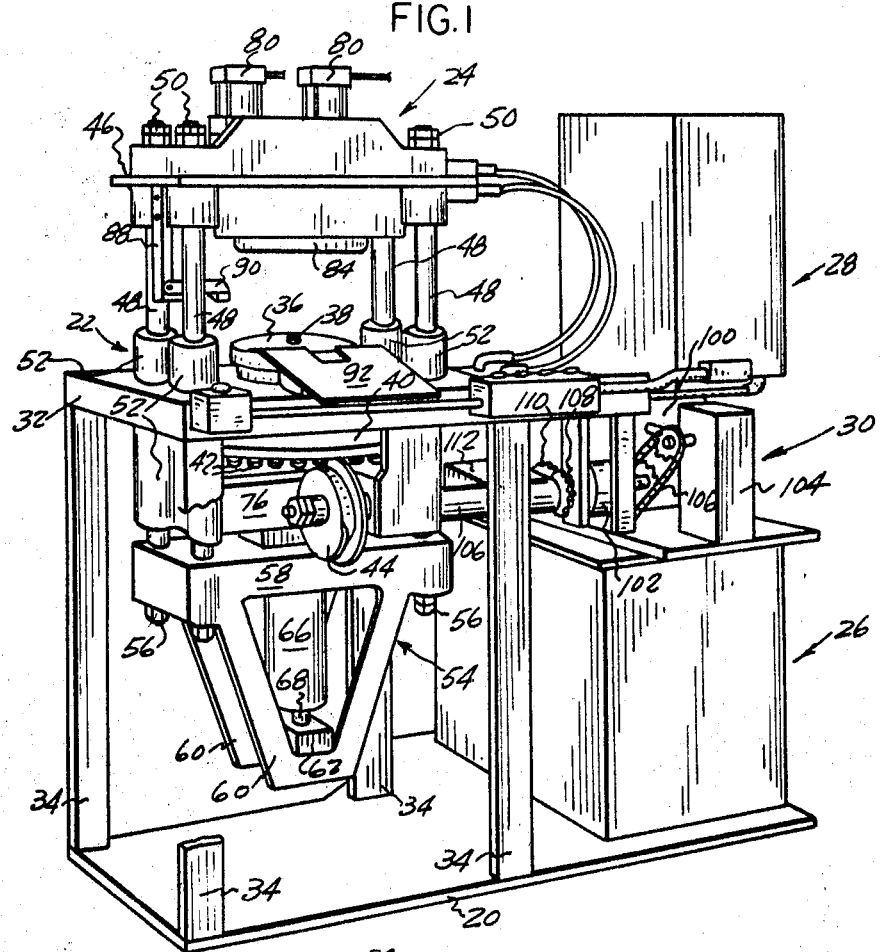
FIGURE 1 is a perspective view of a machine constituting a preferred embodiment of the invention with the safety gate removed for purposes of illustration.

Referring to the drawings, and FIGURE 1 in particular, the machine is supported on a base 20 and broadly includes a work piece supporting and indexing structure generally indicated at 22, a tooling head generally indicated at 24 supporting the cutters which operate upon the work piece, a hydraulic power support generally indicated at 26, an electrical control panel generally indicated at 28, and a driving section generally indicated at 30.

The work piece supporting and indexing section 22 is arranged about a table 32 supported above the base 20 by four vertical leg members 34. The upper side of the table 32 rotatably supports a work piece retaining fixture 36 having a configuration that is dependent upon the specific shape of a part to be operated upon by the machine. The support 36 is fixed on a vertical shaft 38 which projects through the table 32 and is journaled in bearings 39 supported in the table and connects at its lower end to a circular index plate 40. A plurality of cam followers 42 are arranged about the perimeter of the under side of the index plate 40. These cam followers are rotatably supported about vertical shafts and are regularly spaced about the perimeter. An indexing cam member 44 cooperates with the cam followers 42 when rotated to produce intermittent indexing and dwell of the index plate 40 and, through the shaft 38, the work support fixture 36, in a manner which will be subsequently described. The intermittent indexing of the support fixture 36 brings successive spaced points on a work piece supported on the fixture into operating relation with tooling supported on the head 24.

The head includes a support plate 46 retained at the upper end of four cylindrical columns 48 disposed in a rectangular array. The upper ends of the columns are threaded and are retained in plate 46 by nuts 50. The columns 48 are supported for vertical sliding motion in bushings 52 which are fixed in the work table 32 and project both above and below it. The lower ends of the columns 48 are fixed to a steel truss generally indicated at 54 by nuts 56. The truss 54 includes an upper plate 58 fixed to the lower end of the four columns 48, and a pair of downwardly extending rib members 60. The rib members extend parallel to one another at a spaced distance and at their lower ends they retain a support block 62 between them.

The truss 54 may be moved vertically by means of a hydraulic cylinder 66 that has its rod 68 connected to the block 62. The cylinder 66 is fixed with respect to the base by means of its upper end being attached to a support 76 which is in turn fixed beneath the downwardly extending sections of the bushings 52. Since the bushings are fixed with respect to the table 32, they retain the support 76 with respect to the frame.

The entire tooling head 24 may be raised or lowered with respect to the work supporting fixture 36 by means of the cylinder 66. When hydraulic fluid is provided to the cylinder 66 so as to cause its rod 68 to extend, the truss 54 moves downwardly with respect to the machine frame and base and lowers the four columns 48. At the extreme extended position of the rod 68 the head 24 is supported in working relationship to the support 36. When the hydraulic fluid is admitted to the rod end of the cylinder 66, the rod 68 retracts, lifting the truss 54 and the columns 48 and moving the head 24 upwardly, out of operating relationship with the work support 36.

The head plate 46 carries appropriate tooling such as punches or forming dies (not shown) which are powered by a pair of hydraulic cylinders 80. This tooling is so supported on the head 24 and so designed as to perform the required operation on an appropriate work piece supported on the member 36. The particular design of the tooling is not of importance to the present invention. This operation is performed on successive points on the work piece during the dwells provided by the index cam 44.

The head plate 46 supports a clamping member 84 on its lower end which is adapted to engage a work piece retained in the support 36 when the head is in its lowered, operating position. This plate 84 is again part of the tooling for a particular application, and its configuration is not of importance to the present invention.

The head plate 46 also carries a downwardly directed arm 88 at a position between two of the columns 48. The lower end of the arm 88 supports a catch member 90 which projects inwardly, between the columns, in the direction of the work piece support 36. The joint between the catch 90 and the arm 88 allows an upward pivoting motion of the catch 90. As the head 24 moves downwardly and the inner end of the catch 90 projects against a work piece disposed on the support 36, the pivotable joint allows the catch to swing upwardly sufficiently to pass by the edge of the work piece. Then the catch swings downwardly again with its inner end at a location under the work piece. When the series of operations have been completed on the work piece and the head 24 lifts, the catch 90 lifts the work piece off of support 36 onto a slide 92 which carries the finished part out of the machine.

The machine is basically powered by a double-ended electric motor 100 which rotates a clutch and brake 102 through a speed reducer 104 and a belt drive 106. The clutch and brake is of a special form of the sprag type. It is novel in that it always terminates its motion at a unique rotational position. The output shaft of the clutch-brake is coupled directly to the index cam 44 through a shaft 106 and by means of gearing 108 and 110 it drives a rotary valve 112 in timed relation to the indexing motion.

The valve 112 makes connections between a pump 114 which is driven by the other end of the shaft of the double ended motor 100, a fluid sump 116, and the cylinders 80. The connections between the rotary valve and indexing cam 44 are such that each rotates at the same rate. For one full rotation of the index cam 44, the index plate 40 and the tool support 36 undergo one complete cycle of rotation and dwell. During that dwell the valve 112 directs fluid to the cylinders 80 to cause the tools to operate upon the presented section of the work piece, and then to retract the tools. At the end of one full rotation of the index plate 40 (representing an integral number of indexes) the clutch-brake 102 terminates rotation of the index cam and the valve and the cylinder 66 is suitably energized to move the head out of operating relationship. The details of this powering sequence, and of the construction of the clutch-brake 102 and the rotary valve 112 will subsequently be disclosed in detail.

Figure 3:
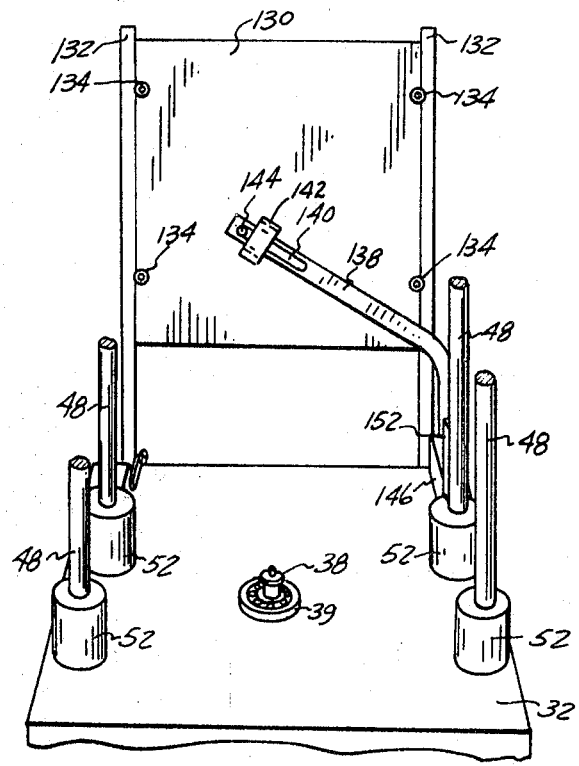
FIGURE 3 is a rear perspective view of the safety gate mechanism of the preferred embodiment of the invention.
Figure 4:
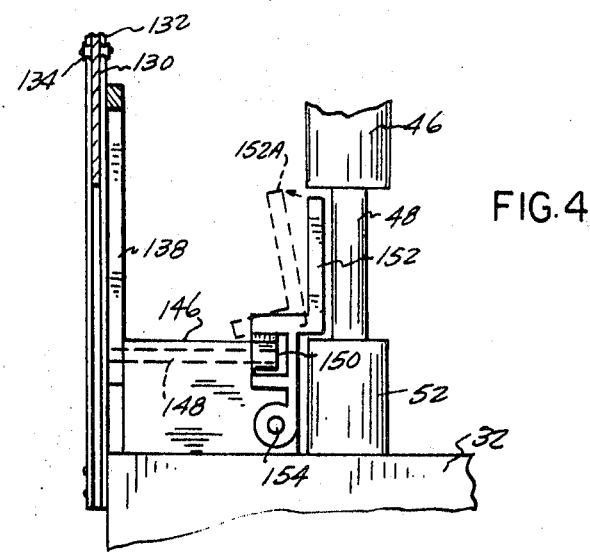
FIGURE 4 is a side view of the safety gate mechanism of FIGURE 3.

The safety gate mechanism employed with the preferred embodiment of the invention is disclosed in FIGURES 3 and 4 and is eliminated from the view of FIGURE 1 for purposes of clarity. It consists of a rectangular guard 130, preferably formed of a transparent material having a width approximately equal to the distance between the columns 48 on opposed sides of the machine and a height approximately equal to the distance between the head plate 46 and the base plate 32 when the head is in a lowered position. The guard 130 is slideably supported on a pair of vertical guides 132 which are arrayed on opposite sides of plate 32 at one side of the machine which will be termed the front and slides on the guides by means of rollers 134.

A handle member, not shown, allows an operator to raise or lower the gate guard 130. When the gate is in the raised position, access may be had under its bottom to the tool support 36. When the gate is in a lowered position it prevents the operator from disposing his hands in the tool area during the cutting or forming operation. An arm member 138 is attached to the rear of the gate 130 by means of an elongated slot 140 formed in the arm, a retaining guide 142 and a roller 144 which is rotatably journaled on the gate. As the gate is moved from its upward position, as shown in FIGURE 3, to its lowered position, the arm 138 swings in a counter clockwise direction as viewed in FIGURE 3 about the roller 144. The opposite end of the arm is pivotably supported in a block 146 which is retained on the base 32. A shaft 148 extends through the base and connects to the arm and to a cam 150 on the opposite end of the block.

The cam 150 makes sliding engagement with a safety stop 152 which is pivotably supported about a shaft 154 for motion in a plane perpendicular to the plane of the arm 138 and the cam 150. The stop may thus be rotated between the full position shown in FIGURE 4 wherein it is disposed in a vertical attitude between the bushing 52 and the head support plate 46, and in a retracted position, 152A, shown in phantom in FIGURE 4, wherein it is pivoted out of position with respect to the bushing and the support plate. When in the vertical position it prevents the head from moving downwardly by abutting the lower end of one of the bushings which form part of the support plate 46 with its upper end. When in this position its lower end is immediately above the upper edge of the bushing 52 so that any deflection will bring it into abutment with the bushing and provide a backing action. When the stop 152 is pivoted out of its vertical position it allows the head to lower in a normal manner.

The stop 152 is pivoted into and out of its locked position by rotation of the arm 138 and the cam 150. As the gate guard 130 lowers the cam 150 rotates to move the stop 152 out of its locked position. When the gate 130 raises the stop is moved back into its safety position. Appropriate connection is made between gate 130 and the head 24 so that the gate rises with the head to move the stop into its locked position. However, the gate 130 must be manually lowered before the head may be moved down again.

The clutch 102 is disclosed in detail in FIGURES 5–9. Rotational input is provided to the clutch through a pulley 170 driven by the belt 106 from the output of the speed reducer 104. A pin 172 drivingly connects the pulley 170 to a clutch input member 174. The input member 174 has a cylindrical outer configuration and is rotatably supported by a ball bearing 176 within a housing member 178 fixed with respect to the machine frame. A retainer ring 180 joins the inner race of the ball bearing to the input member 174. A similar retaining ring 182 supports the outer race of the ball bearing with respect to the housing member 178.

Output is provided from the clutch-brake 102 by the shaft 106 which connects to the index cam 44. The driving gear 108 for the rotary valve is retained on the shaft 106 by a pin 186. The shaft 106 is integrally formed with the clutch output member 188. This member has a plurality of octagonally arranged flats 190 formed on its center section and terminates in a shaft-like aligning section 192 which is rotatably supported within a central hole 194 formed in the input member 174 by a bushing 196. The end of the member 192 projects through the input pulley 170 and is threaded and retained by a nut 198. A washer-like bushing member 200 also extends between the shoulder formed between output 188 and its extending section 192 and a complementary shoulder formed in the input member 174.

As may best be seen in FIGURE 7 the input member 174 has a cylindrical section which surrounds the octagonal flats 190 leaving a space between them. A cage member has eight spaced fingers 202 which project into the space between the flats 190 and the internal diameter of the cylindrical section of the input member 174. The fingers 202 are joined together at one end by the cage section 204 and they project inwardly between the flats 190 and the surrounding surface of the input member 174. Eight rollers 206 are disposed between the fingers 202. The rollers 206 have a diameter which is smaller than the clearance between the centers of any of the flats 190 and the surrounding cylindrical input member, but less than the clearance between the intersection of two of the flats 190 and the surrounding cylindrical section. Accordingly, when the cage 204 is so positioned with respect to the output member 188 that the rollers 206 are arrayed over the center of the flats 190, the output member 188 is free to rotate with respect to the input member 174. However, when the cage member 204 is so positioned with respect to the output member 188 that the rollers 206 are moved away from the center of the flats 190, in either direction, the rollers become wedged between the flats and the surrounding cylindrical section of the input member 174 and lock the output member 188 against rotation with respect to the input member 174. When the two are locked together any rotation imparted to the input member is conveyed to the output member and, thus, to the output shaft 106. When one is free to rotate with respect to the other the rotation of the input member is not transferred to the output member. When the two are locked together, and the direction of rotation of the input member is such as to tend to wedge the rollers further between the input member and the flats 190, a strong and direct drive is provided through the clutch.

The cage member 204 is normally maintained in this locked position with respect to the output member 180 by means of a coil spring 208 which has one end fixed about a pin 210 projecting from the cage 204, and the other end fixed to a pin 212 projecting from the input member 188. The spring is arrayed circumferentially about the input member 188 and tends to pull the two pins 210 and 212 together so as to maintain the cage in a locked position with respect to the output member.

As thus far described, with the exception of the spring 208, the sprag clutch is substantially similar to those well known in the art. The clutch differs from standard units in the manner in which it is caused to disengage at a particular rotational position of the output member 188, and in the manner in which that output member is locked against rotation when the clutch is so disengaged. The novel locking and disengaging mechanism employs an arm 214 which has one end pivotably supported with respect to the clutch housing by means of a shaft 216 which extends parallel to the clutch output member. A ball 218 which is retained within a cylindrical bore 220 in an extension of the housing projects out of the bore and abuts an upper surface of the arm 214 under bias of a coil spring 222 which is retained in the bore 220. This mechanism tends to urge the arm 214 toward motion in a counter-clockwise direction as viewed in FIGURE 5.

The other end of the arm rests on the rod 224 of an electrical solenoid 226. The rod 224 is normally in the retracted position as shown in full lines in FIGURE 5. When current is applied to the solenoid 226 the rod 224 extends and pivots the arm 214 in a clockwise direction about the shaft 216, against the bias of the ball 218, compressing the spring 222, into the phantom position shown in FIGURES 5, 8 and 9.

The arm 214 has a pair of extending shoulders 228 and 230 projecting from the side adjacent to the clutch 102, midway between its pivot point and its extreme end. When the arm is in the phantom position shown in FIGURES 5, 8 and 9 these shoulders do not contact the clutch and the spring 208 positions the cage 204 with respect to the output member 188 so that the input member and output members are locked together. When the solenoid 226 is de-energized so that the arm 214 moves in a counterclockwise direction an extending radial surface 232 on the output member 188 rotates into abutment with the extending shoulder 228 and is thereby locked against rotation. Further downward movement of the arm 214 causes an arm section 234. (FIGURE 8) to come into contact with a shoulder 236 formed on the cage 204 so as to cause the cage to rotate in a clockwise direction as seen in FIGURES 7, 8 and 9, against the pressure of the spring 208, causing the spring to extend, until the shoulder 230 comes into abutment with a second shoulder 238 formed on the cage 204. At that position the shoulder 238 on the cage 204 and the shoulder 232 on the output member 188 are so aligned that the rollers 206 are disposed in the center of the flats 190 and input member 174 is free to rotate without transferring any of its motion to the output member. The motion of the output member is also terminated at a unique rotational position. When the solenoid 226 is energized so as to extend its shaft 224, the arm 214 is pivoted out of contact with the clutch and the output member is again locked to the input member.

When the clutch 102 is locked into a disengaged position by the arm 214 a hole 209 found in one end of the cage 204 is in direct alignment with a pin 211 which is supported for sliding motion toward and away from the hole 209 in the output member 188. The pin 211 is supported in a cylindrical hole 213 and is normally biased into a position away from the hole 209 by a spring 215. An extending section 217 allows the pins 211 to be urged against the bias of the spring into the hole 209 when the two members are aligned. If the pin is thus inserted prior to the time of lifting of the arm 214, when the arm 214 is lifted the force tending to separate the cage 204 from the output member 188 will lock the pin 211 into place. Thus the pin may be used for maintenance or setup purposes when it is desired to disengage the clutch without maintaining the solenoid 226 energized.

The rotary valve 112 which is driven in timed relation to the shaft 108 by means of the gearing 108 and 110 is disclosed in detail in FIGURES 10–15. It basically includes a cylindrical spool generally indicated at 250 which is rotated within a tubular valve body 252. The spool 250 has various reliefs and passages which act to establish full communication between various lines which connect to the valve body, at particular rotational positions of the spool. The spool undergoes one complete rotation for each rotation of the shaft 106, and during such rotation completes a full cycle of fluid connections and disconnections causing the machine to undergo one full operating cycle.

The cylindrical steel valve body 252 is closed at one end by cap 256. The other end journals a ball bearing set 258 which rotatably supports a cylindrical plug 260 on its inner race. The plug 260 has an extending shaft section 262 which connects to the gear 110 by means of a roll pin 264. The interior of the end plug 260 has a transverse slot which makes driving connection with a key 266 which projects from one end of the spool 250. Thus the rotation of the gear 110 is transferred to the spool.

The spool receives pressure from the hydraulic system pump through a port 280 formed in the wall of the valve housing 252. At all rotational positions of the spool this port 280 is in contact with a peripheral land 282 that extends fully around the perimeter of the spool. By means of a bored hole 284 through the spool the land 282 always directs pressured fluid to another land 286 which extends for 198½° about the perimeter of the spool. The relationship of the various lands is best seen in the layout section of FIGURE 15. Another 153¾° of the perimeter of the spool and on the same axial position as the land 286 is occupied by a land 288. This land is continually connected to the fluid sump or tank by means of a pair of passages 290 which project parallel to the axis and connect with the land 288 by passages 292 (best seen in FIGURE 14). At the ends of the spool these passages make connection with a port 296 which extends to the fluid sump. A port 298 in the valve housing 252 is associated with the axial position of the lands 286 and 288 and connects with the rod ends of the cylinder 80. During 198½° of rotation of the spool the rod ends of the cylinder 80 are thus connected to the land 286 and fluid pressure is exerted against them so as to cause the rods to retract. During the 153¾° in which the land 288 is in contact with a port 298 the rod ends of the cylinder 80 are connected to the fluid sump.

A bore 300 connects the pressure land 282 with another land 302 disposed on the side opposite to the land 286. The land 302 extends for 150° and another 169° of the spool perimeter at the same axial location is occupied by a land 304 which is connected to the fluid sump by passages 306 and 308 which communicate to a port 310. The lands 302 and 304 sequentially communicate with a port 312 formed in the valve housing 252. The port 312 connects to the blind ends of the cylinders 80 so as to sequentially apply fluid under pressure to the pistons associated with the cylinders 80, and then connect them to the sump. By means of the ports 298 and 312 the rods of the cylinder are sequentially extended and retracted during one complete rotation of the spool 250. These lands and ports thus act as a four-way, two position valve.

In order to minimize the twisting moments exerted on the spool within the housing, another pair of lands 316 and 318 are provided on the opposed extreme ends of the spool and are connected by passages 320 and 322 respectively to the lands 300 and 286 respectively. Located on the opposite sides of the spool from the lands to which they are connected, these extreme lands maintain the valve in a state of rotational balance with very small net moments exerted perpendicular to the axis of the spool. The land 318 also connects to a port 324 formed in the valve housing during 150° of the rotation of the valve, for purposes which will be subsequently noted.

Figure 16:
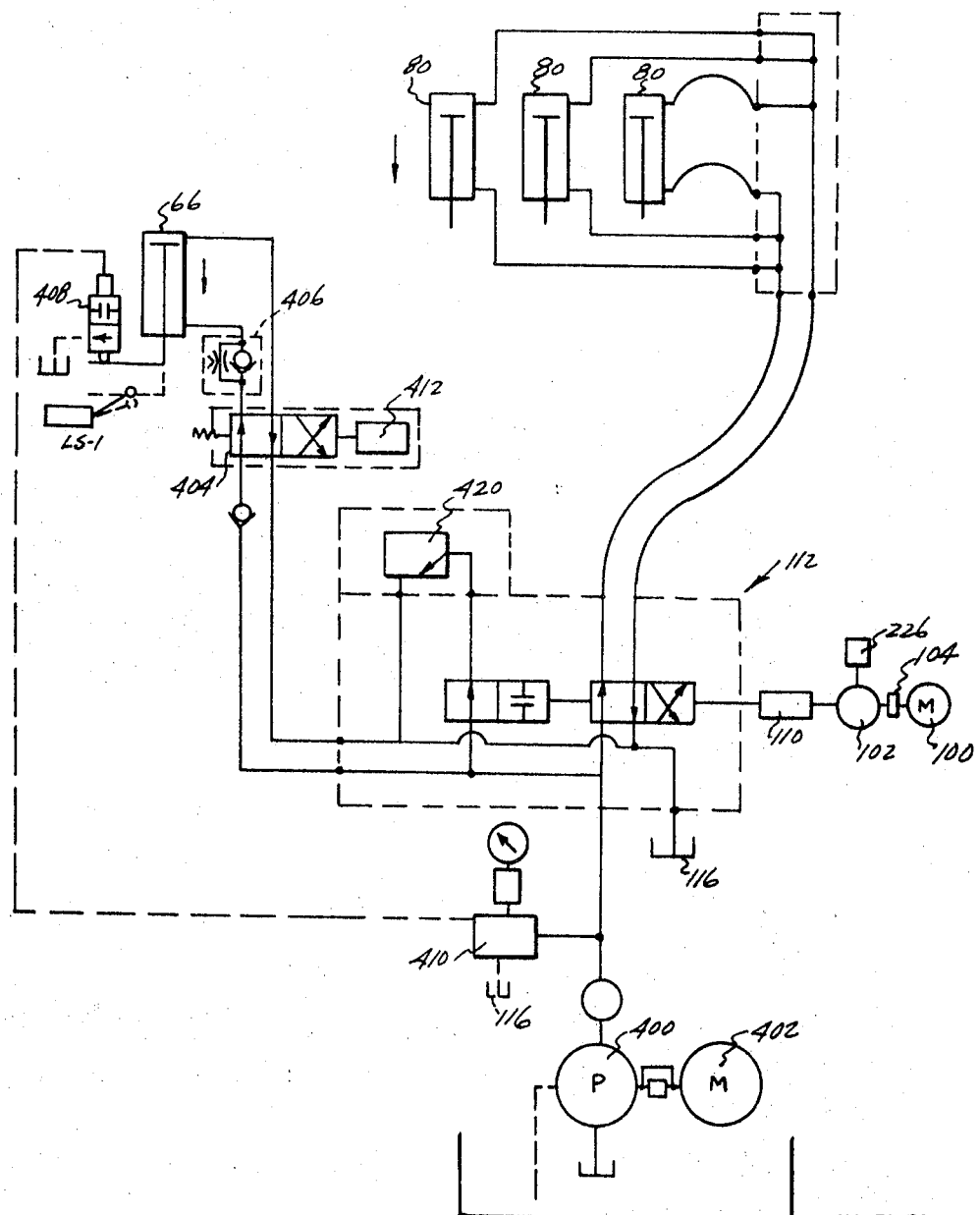
FIGURE 16 is a schematic diagram of the hydraulic system.
Figure 17:
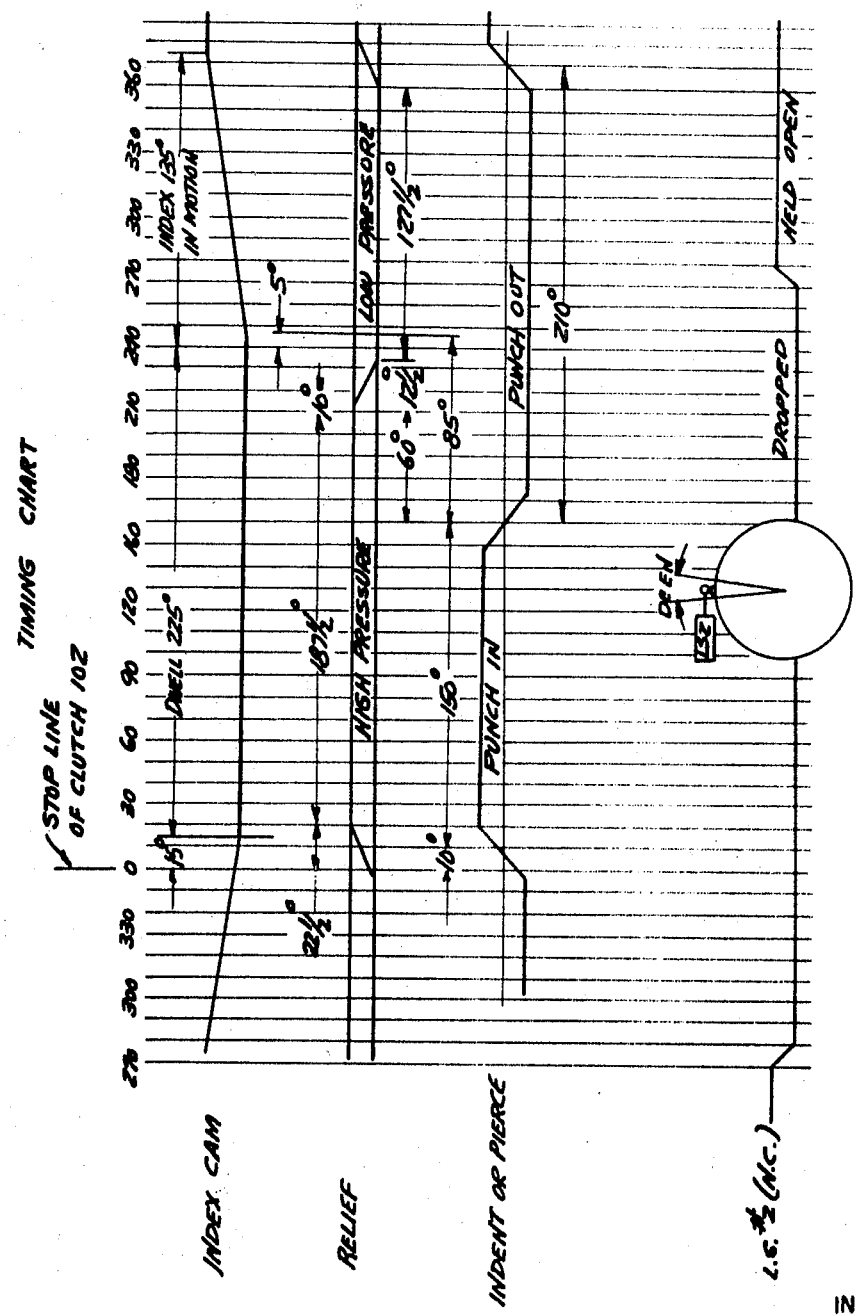
FIGURE 17 is a timing diagram, graphically illustrating the machine motions which occur in timed relation to the valve rotation.

Referring now to the hydraulic diagram of FIGURE 16 and the timing chart of FIGURE 17, assume an operational cycle to begin with the clutch 102 deenergized and the head 24 in its upper or loading position. In this position neither the valve 112 nor the index cam 44 are being rotated. A fluid pump 400, driven by motor 402, directs fluid through a four-way two position valve 404 and adjustable flow control valve 406 to the rod end of the hydraulic cylinder 66. A pilot valve 408 associated with the head 24 controls a high pressure relief valve 410 which dumps a portion of the pump fluid to the sump 116. When a part is completely loaded the solenoid 412 which controls the valve 404 is energized so as to shift the valve and direct pressure fluid to its blind end, lowering the head into operating position.

A limit switch, LS1, senses the lowering of the head and energizes the solenoid 226 so as to shift the clutch 102 into locked condition and begin the rotation of the valve 112 and the index cam 44. The index cam had previously terminated its motion adjacent to the beginning of a dwell. Accordingly, the normally closed limit switch, LS2, which is held open during a substantial portion of the indexing motion, is deenergized. As the dwell begins the valve 112 directs fluid to the blind end of the cylinders 80 to bring them downwardly into the piercing cycle. They remain in for approximately 150° until the valve 112 effectively shifts the connection to direct fluid to the rod ends of the cylinders 80, lifting the piercing cylinders. Shortly after the cylinders are lifted the valve 112 directs fluid to a low pressure relief valve 420 through the port 324, lowering the sustaining pressure of the cylinders. This cycle continues until the full number of operations have been performed on the work piece. In the middle of the last index at appropriate limit switch (not shown) associated with the cam plate 42, indicates that the full count of indexes have been performed. Upon the next opening of the limit switch, LS2, the solenoid 226 is energized opening the clutch 102 and terminating its rotation at the predetermined position. At the same time the solenoid 312 is energized so as to shift the valve 304 and lift the head 66. A medium hydraulic pressure is maintained until the head is completely lifted on the pilot valve 308 as energized actuating the relief valve 310.

Having thus described my invention, I claim:

1. A machine for performing a series of identical operations at regular rotational intervals about a workpiece, comprising: a rotatable workpiece support; an index mechanism drivingly connected to said support, having a rotational input, and being operative to rotate the support through angular intervals and provide periods of dwell between such rotations as its input is constantly rotated; tooling members operative to perform operations on a particular point of a workpiece retained on said support; means for moving said tooling into and out of operating contact with a workpiece retained on said support; means for providing a powered rotational input to the index mechanism and to the means for moving the tooling into and out of contact with the workpiece in timed relationship to one another; and means to automatically positively connect and disconnect said powered rotational input at predetermined rotational intervals from said index mechanism and said means for moving the tooling, whereby a sequence of identical operations may be performed at various points on said workpiece by sequentially rotating said support plate, bringing said tooling into contact with said workpiece, bringing said tooling out of contact with said workpiece, and again rotating said support plate.

2. The machine of claim 1 wherein the means for moving said tooling into and out of operating contact with said work piece comprises a hydraulic power supply, a hydraulic actuator supporting said tooling, and a rotary valve connected between said power supply and said actuator operative to direct fluid in such a manner as to alternately extend and retract said actuator in timed relation to the rotation of the valve spool.

3. The machine of claim 1 wherein the index mechanism includes a plurality of cam followers associated with the work piece retaining plate, and a cam drivingly connected to the rotational input to the mechanism, which interacts with the cam followers during rotation so as to cause the plate to sequentially index and dwell.

4. The machine of claim 1 wherein the means for bringing said tooling into and out of operating contact with the work piece, constitutes a hydraulic power system employing a valve having a spool which is rotatable with respect to its outer housing, and the valve's spool and the rotational input to the index mechanism are rotated from a common shaft.

5. The machine of claim 4 wherein the rotational input to the index mechanism and the valve spool are powered by an electric motor through a clutch operative to terminate the motion of its output at a unique rotational position when deenergized.

6. The machine of claim 5 wherein means are provided for deenergizing the clutch following the occurrence of a predetermined number of motions of the index mechanisms.

7. The machine of claim 1 wherein the tooling members are supported on a head moveable toward and away from said work piece support and wherein means are provided for preventing access to the tooling area at such time as the head is in a position toward said work piece.

8. A machine for performing a plurality of operations on a single work piece, comprising: a work piece support; tooling operative to perform an operation upon said work piece; means for moving said work piece support with respect to said tooling so as to present sequential areas of said work piece in operating relationship to said tooling; hydraulic actuators joined to the tooling and operative to bring said tooling into and out of operating relation with said areas of said work piece; a hydraulic power supply; a valve connecting said power supply to said actuators, said valve having a tubular housing, a cylindrical spool rotatable in said housing, a plurality of ports passing through the housing making contact with sections of the perimeter of the spool, and a plurality of lands formed on the surface of said spool and bores passing through said spool and connecting various of the lands, whereby various of the ports are connected to and disconnected from one another upon the rotation of the spool; and means for rotating said spool in timed relation to the motion of the work piece support means.

9. The machine of claim 8 wherein the hydraulic actuators include a cylinder and piston and the valve upon rotation of the spool, sequentially directs fluid to the rod end of the cylinder and then to the blind end.

10. The machine of claim 8 wherein means for moving the work piece support comprises an index mechanism operative to provide a rotation of the support, and then a dwell upon rotation of an input member, and that input member is mechanically coupled to the spool of the valve.

11. The machine of claim 1 wherein the means for providing a powered rotational input to the index mechanism and to the means for moving the tooling into and out of contact with the work piece includes a motor and a clutch-brake having its input drivingly connected to the motor and its output drivingly connected to both the index mechanism and to the means for moving the tooling into and out of contact with the work piece, said clutch-brake having a first state wherein its output is drivingly connected to its input, and a second state wherein its output is rotationally free of the input, and its output is locked at a predetermined angular position.

12. The machine of claim 11 wherein the clutch-brake includes a first member having a cylindrical cavity formed therein; a second member having a cylindrical surface rotatably disposed within said cavity; a cylindrical cage having a plurality of axially extending fingers disposed about its perimeter, with said fingers extending into said cavity; a plurality of rollers supported in said cavity between said fingers; a plurality of flats formed on one of the cylindrical surfaces surrounding the cavity; bias means for normally urging the member having the flats formed thereon into a particular rotational alignment with the cage, whereby the clutch is engaged for rotating said cage out of said rotational position with respect to the cylindrical member having the flats formed thereon, to disengage said clutch; and means for locking said member having the flats formed on its cylindrical surface against rotation, at a particular rotational position.

13. The machine of claim 12 wherein the means for moving the tooling into and out of contact with the work piece comprises a hydraulic power supply, a hydraulic actuator supporting said tooling, and a rotary valve connected between said power supply and said actautor operative to direct fluid in such a manner as to alternately extend and retract said actuator in timed relation to the rotation of the valve spool.

14. The machine of claim 13 wherein the index mechanism includes a plurality of cam followers associated with the work piece retaining plate, and a cam drivingly connected to the rotational input to the mechanism, which interacts with the cam followers during rotation so as to cause the plate to sequentially index and dwell.

15. A machine for performing a series of identical operations at regular rotational intervals about a work piece, comprising: a base; a rotatable work piece support retained on said base; an index mechanism drivingly connected to said support, having a rotational input, and being operative to rotate the support through the angular intervals and provide periods of dwell between such rotation as its input is constantly rotated; a head member supported for motion toward and away from said work piece support; tooling operative to perform operations on a particular point of a work piece retained on said support; hydraulic actuators fixed to said head and retaining said tooling members and operative to move said tooling into and out of operating contact with the work piece retained on said support; rotary valve means for directing fluid to the actuators; and means for providing a powered rotational input to the index mechanism and the valve means in timed relationship to one another, whereby a sequence of identical operations may be performed at various points on said work piece by sequentially rotating said support plate, bringing said tooling into contact with said work piece, bringing said tooling out of contact with said work piece, and again rotating said support plate.

16. The machine as defined in claim 15, further comprising means between said powered rotational input and said index mechanism and valve means to positively stop rotation of said powered rotational input at predetermined intervals.

17. In the machine as defined in claim 16, said means to stop rotation comprising a clutch-brake associated with said rotational input provided with locking means adapted to lock or unlock said clutch-brake in timed sequence.

18. In the machine as defined in claim 17 said locking means being automatically responsive at a predetermined rotational position of said index mechanism.

19. The machien as defined in claim 17 in which said clutch-brake comprises a free-wheeling device.

20. The machine as defined in claim 15, in which said rotational input to said rotary valve means and said index mechanism comprises a motor having an output shaft, a speed reducer mechanism drivingly connected to said output shaft, said speed reducer having an output shaft, a gear on said last named output shaft; said rotary valve means having a spool and a gear attached to said spool adapted to be in constant mesh with said gear on said last named output shaft to be driven thereby in timed sequence.

21. In the machine as defined in claim 20, said last named output shaft being further provided with means to drive said index mechanism.

22. In the machine as defined in claim 21, said index mechanism comprising a series of cam followers attached to said rotatable workpiece support and a cam drivingly connected to said last named output shaft adapted to act on said cam followers upon rotation of said last named output shaft to rotate said rotatable workpiece support in timed sequence.

23. In the machine defined in claim 22, said cam having lobe means to cause said rotatable workpiece support to alternately index and dwell during rotation.

24. The machine as defined in claim 20, further comprising a positive clutch-brake means between said motor and said speed reducer mechanism to positively stop rotation of said rotational input at predetermined intervals.

25. In the machine as defined in claim 24, said positive clutch-brake means comprising a lockable free-wheeling device automatically responsive to be locked at a predetermined rotational position of said index mechanism.

References Cited

UNITED STATES PATENTS

| | | | |
|---|---|---|---|
| 1,658,151 | 2/1928 | Wyrfel | 83—544 X |
| 2,319,232 | 5/1943 | Holmes et al. | 83—267 X |
| 2,561,766 | 7/1951 | Adams et al. | 83—267 X |
| 2,730,175 | 1/1956 | Piperoux et al. | 83—69 X |

JAMES M. MEISTER, Primary Examiner

U.S. Cl. X.R.

74—822, 827; 83—267, 411

UNITED STATES PATENT OFFICE
CERTIFICATE OF CORRECTION

Patent No. 3,459,079                                             August 5, 1969

William J. De Gain

Figure 2:
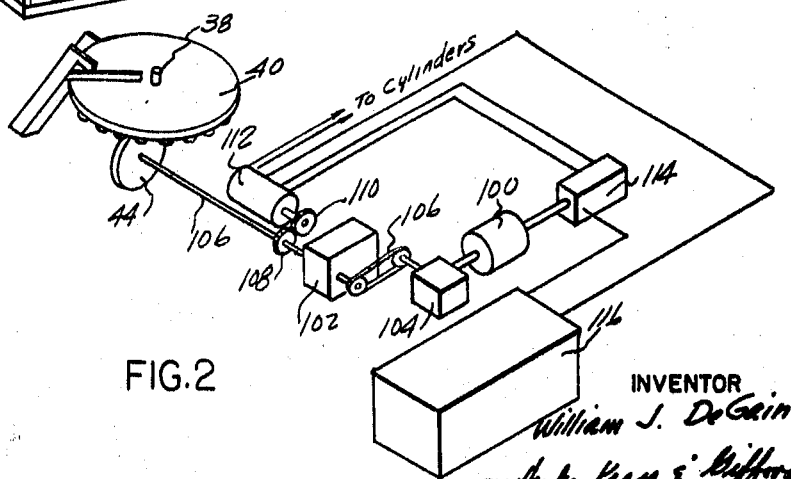
FIGURE 2 is a schematic view of the driving system of the preferred embodiment of the present invention.

It is certified that error appears in the above identified patent and that said Letters Patent are hereby corrected as shown below:

In the drawings, Figs. 1, 2 and 6, change reference numeral of shaft from "106" to -- 107 --; Fig. 13, add reference number "322"; Fig. 7, change "190 (upper)" to -- 206 --. Column 4, line 13, "106" should read -- 107 --; line 22, "tool" should read -- work piece --; line 51, "tool" should read -- work piece --; line 63, "base" should read -- block --. Column 5, line 31, "106" should read -- 107 --; line 33, "106" should read -- 107 --; line 37, after "supported" insert -- by a bushing 196 --; line 38, cancel "by a bushing 196"; line 57, "less" should read -- greater --; line 73, "106" should read -- 107 --. Column 6, line 6, "108" should read -- 188 --; line 9, "input" should read -- output --; line 11, "input" should read -- output --. Column 7, line 11, "108", first occurrence, should read -- 107 --; line 19, "106" should read -- 107 --. Column 8, line 4, "300" should read -- 302 --; line 45, "at" should read -- an --; line 46, "42" should read -- 40 --; line 51, "304" should read -- 404 --; line 54, "308" should read -- 408 --; same line 54, "310" should read -- 410 --.

Signed and sealed this 16th day of June 1970.

(SEAL)
Attest:

EDWARD M. FLETCHER, JR.                        WILLIAM E. SCHUYLER, JR.
Attesting Officer                                      Commissioner of Patents